(12) United States Patent
Taniguchi et al.

(10) Patent No.: US 8,439,338 B2
(45) Date of Patent: *May 14, 2013

(54) ROTARY TABLE DEVICE PROVIDED WITH COOLING STRUCTURE AND ROTARY BEARING PROVIDED WITH COOLING STRUCTURE

(75) Inventors: Shigeru Taniguchi, Tokyo (JP); Toshiyuki Aso, Tokyo (JP); Toshiya Tanaka, Tokyo (JP)

(73) Assignee: THK Co., Ltd., Tokyo (JP)

( * ) Notice: Subject to any disclaimer, the term of this patent is extended or adjusted under 35 U.S.C. 154(b) by 326 days.

This patent is subject to a terminal disclaimer.

(21) Appl. No.: 12/919,064

(22) PCT Filed: Feb. 16, 2009

(86) PCT No.: PCT/JP2009/052468
§ 371 (c)(1),
(2), (4) Date: Aug. 24, 2010

(87) PCT Pub. No.: WO2009/107493
PCT Pub. Date: Sep. 3, 2009

(65) Prior Publication Data
US 2011/0001282 A1    Jan. 6, 2011

(30) Foreign Application Priority Data

Feb. 29, 2008 (JP) ................................ 2008-050364

(51) Int. Cl.
*B23Q 1/25* (2006.01)

(52) U.S. Cl.
USPC ................ 269/55; 269/60; 269/70; 269/21; 269/75; 108/22; 384/108; 384/613; 384/456; 74/16; 74/89.34

(58) Field of Classification Search ........... 269/55, 269/60, 71, 21, 75; 108/20, 21, 22, 94; 384/108, 384/107, 613, 113, 476, 486, 456, 461, 494; 74/16, 89.34, 89.33

See application file for complete search history.

(56) References Cited

U.S. PATENT DOCUMENTS 3,650,583 A * 3/1972 Itin et al. ............... 384/613
3,889,555 A * 6/1975 Frank et al. ............. 74/826

(Continued)

FOREIGN PATENT DOCUMENTS

CH    286939    3/1953
JP    61-164740    7/1986

(Continued)

OTHER PUBLICATIONS

International Search Report—PCT/JP2009/052468—Apr. 7, 2009.

*Primary Examiner* — Joshua J Michener
*Assistant Examiner* — Matthew Gitlin
(74) *Attorney, Agent, or Firm* — Young & Thompson (57) ABSTRACT

A rotary table device includes a cooling structure and a rotary bearing provided with a cooling structure. A rotary table device provided with a cooling structure includes a hollow motor as a drive source, a table rotated by the hollow motor, and a rotary bearing supporting rotational motion of the table, in which the rotary bearing includes an outer ring having an inner peripheral surface to which a rolling surface is formed, an inner ring having an outer peripheral surface to which a rolling surface facing the rolling surface of the outer ring is formed, and a number of rolling members in a rolling passage formed by the rolling surface of the outer ring and the rolling surface of the inner ring, and a heat sink is formed to either one of the inner and outer rings.

4 Claims, 4 Drawing Sheets

U.S. PATENT DOCUMENTS

| | | | |
|---|---|---|---|
| 4,403,567 A | * | 9/1983 | daCosta et al. ............... 118/500 |
| 4,656,951 A | * | 4/1987 | Kimura et al. ................... 108/20 |
| 4,778,287 A | * | 10/1988 | Jacob et al. .................... 384/613 |
| 4,788,397 A | * | 11/1988 | Danley .......................... 219/755 |
| 4,906,011 A | * | 3/1990 | Hiyamizu et al. .................. 279/3 |
| 5,010,295 A | * | 4/1991 | Lindsay ................... 324/750.19 |
| 5,201,249 A | * | 4/1993 | Sterenberg ...................... 74/825 |
| 5,239,892 A | * | 8/1993 | Sakai .......................... 74/813 L |
| 5,676,360 A | * | 10/1997 | Boucher et al. ................. 269/74 |
| 5,678,929 A | * | 10/1997 | Parsoneault et al. .......... 384/112 |
| 5,707,154 A | * | 1/1998 | Ichiyama ..................... 384/107 |
| 5,806,987 A | * | 9/1998 | Nose et al. .................... 384/100 |
| 5,810,342 A | * | 9/1998 | Kitamura et al. ............... 269/60 |
| 5,826,989 A | * | 10/1998 | Obara et al. .................. 384/613 |
| 6,073,681 A | * | 6/2000 | Getchel et al. ............... 165/80.1 |
| 6,375,176 B1 | * | 4/2002 | Getchel et al. .................. 269/21 |
| 6,648,602 B2 | * | 11/2003 | Horng et al. .................. 416/203 |
| 6,664,673 B2 | * | 12/2003 | Lopatinsky et al. ............ 310/63 |
| 6,741,001 B2 | * | 5/2004 | Takayanagi ..................... 310/90 |
| 7,056,030 B2 | * | 6/2006 | Koyama et al. .............. 384/613 |
| 7,318,674 B2 | * | 1/2008 | Aiello ........................... 384/112 |
| 7,918,440 B2 | * | 4/2011 | Schiavi et al. .................. 269/21 |
| 2010/0102496 A1 | * | 4/2010 | Taniguchi et al. .............. 269/55 |
| 2011/0243488 A1 | * | 10/2011 | Kizawa et al. ............... 384/569 |

FOREIGN PATENT DOCUMENTS

| | | |
|---|---|---|
| JP | 4-47937 | 4/1992 |
| JP | 2004-130468 | 4/2004 |
| JP | 2007-138966 | 6/2007 |

* cited by examiner

(A-A section)

ROTARY TABLE DEVICE PROVIDED WITH COOLING STRUCTURE AND ROTARY BEARING PROVIDED WITH COOLING STRUCTURE

TECHNICAL FIELD

The present invention relates to a rotary table device and a rotary bearing, used for a machine tool, provided with a cooling structure.

BACKGROUND ART

In recent machine tools, there is known one provided with a triaxially driving mechanism which moves a main shaft portion (spindle portion), to which a machine tool is mounted, in X-, Y- and Z-axis directions and a rotationally driving mechanism for rotating a holding portion such as table for holding a work to be worked (workpiece) around a C- and/or A-axis (for example, refer to Patent Document 1 mentioned hereunder).

In such machine tool, generally, the triaxially driving mechanism is driven by a linear motor, and the rotationally driving mechanism is driven by a hollow motor. Particularly, the rotationally driving mechanism extremely speedily starts to operate by the direct driving of the hollow motor, and moreover, it is not necessary for a mechanism for rotationally driving the C-axis and A-axis to be provided with any transmission member such as pulley and/or reduction mechanism, thus achieving advantageous effect.

Further, in such rotationally driving mechanism, it is necessary to appropriately rotate the holding member such as table holding the workpiece to be worked around the C- and/or A-axis, and because of this reason, the holding member is mounted to a bed or like of the machine tool by means of bearing.

Patent Document 1: Japanese Patent Application Laid-open Publication No. 2004-130468

DISCLOSURE OF THE INVENTION

Problems to be Solved by the Invention

Incidentally, it is required for the holding member of the structure mentioned above not only to be rotated by 1000-1200/min. (revolution number) for working the workpiece but also to have high rigidity for surely and stably holding the workpiece.

However, for the rotary bearing supporting the holding member, it is very difficult to achieve both the functions of high speed rotation and high rigidity at the same time. That is, in order to stably realize the high speed rotation, it may be preferred to use a rotary ball bearing incorporated with balls each having a small contacting area, but it is difficult for the rotary bearing to stably satisfy the high rigidity required for the machine tool. On the other hand, in order to satisfy the high rigidity required for the machine tool, it may be possible to use a rotary roller bearing incorporated with rollers each having a contacting area larger than that of the ball. However, in the case of using the rotary roller bearing, although the high rigidity may be achieved, load such as friction caused by high speed rotation due to large contacting area will become large, which may result in heat generation of a member on the rotating side and transfer of such heat to a member on a side, opposite to the rotating side, performing no rotational drive motion, thus being inconvenient.

Accordingly, in the conventional machine tools having multi-axis driving structure such as proposed in the Patent Document 1 mentioned above, it was impossible to sufficiently achieve desired function and effect based on the adoption of the direct driving mechanism.

The present invention was conceived in consideration of the circumstances mentioned above and an object thereof is to provide a rotary table device provided with a cooling structure and a rotary bearing provided with a cooling structure capable of achieving suitable cooling effect to thereby simultaneously realize high speed rotation, high rigidity and high load bearing performances of the rotary bearing utilized for a machine tool. Furthermore, the present invention aims to provide a machine tool sufficiently achieving merits of a multi-axis driving by utilizing the rotary table device and the rotary bearing both being provided with the cooling structure.

Means for Solving the Problems

The rotary table device provided with a cooling structure of the present invention includes: a hollow motor arranged as a drive source; a table to be rotated by the hollow motor; and a rotary bearing supporting rotational motion of the table, the rotary bearing including: an outer ring having an inner peripheral surface to which a rolling surface is formed; an inner ring having an outer peripheral surface to which a rolling surface facing the rolling surface of the outer ring is formed; and a number of rolling members disposed in a rolling passage formed by the rolling surface of the outer ring and the rolling surface of the inner ring, wherein a heat sink is formed to either one of the inner ring and outer ring.

In the rotary table device provided with a cooling structure according to the present invention, it may be preferred that the table is provided with a blower blade.

Further, in the rotary table device provided with a cooling structure according to the present invention, it may be desired that the blower blade is arranged at a position opposing to the heat sink.

Furthermore, in the rotary table device provided with a cooling structure according to the present invention, the heat sink may be formed along an entire circumferential direction of a peripheral portion of the inner ring or outer ring.

Still furthermore, in the rotary table device provided with a cooling structure according to the present invention, the blower blade and the heat sink may be disposed in a space sectioned from an outside thereof by a shielding member including a labyrinth structure.

The rotary bearing provided with a cooling structure according to the present invention includes: an outer ring having an inner peripheral surface to which a rolling surface is formed; an inner ring having an outer peripheral surface to which a rolling surface facing the rolling surface of the outer ring is formed; and a number of rolling members disposed in a rolling passage formed by the rolling surface of the outer ring and the rolling surface of the inner ring, wherein a heat sink is formed to either one of the inner ring and outer ring.

In the rotary bearing provided with a cooling structure of the present invention, it may be preferred that the heat sink is formed along an entire circumferential direction of a peripheral portion of the inner ring or outer ring.

Effects of the Invention

According to the present invention, since there are provided a rotary table device provided with the cooling structure and the rotary bearing also provided with the cooling structure capable of achieving suitable cooling effects, it becomes possible to simultaneously realize high speed rotation, high rigidity and high load bearing performances of the rotary bearing utilized for a machine tool. Furthermore, it becomes possible to provide a machine tool sufficiently achieving merits of a multi-axis driving performance by utilizing the rotary table device and the rotary bearing both being provided with the cooling structure according to the present invention.

REFERENCE NUMERALS

5 - - - rotary table device, 10 - - - hollow motor, 12 - - - permanent magnet, 13 - - - upper member, 13a - - - fin-shaped portion, 14 - - - lower member, 16 - - - coil portion, 17 - - - fixed member, 20 - - - table, 21 - - - extension, 22 - - - labyrinth structure, 24 - - - space, 25 - - - bolt, 26 - - - fan blade, 30 - - - roller, 36 - - - heat sink, 40 - - - brake shaft, 41 - - - brake device, 50 - - - rotary joint, 61 - - - fixed member, 62 - - - bolt, α - - - cooling medium introducing path, β - - - cooling medium discharge path.

MODE FOR CARRYING OUT THE INVENTION

Hereunder, a preferred embodiment for carrying out the present invention will be described with reference to FIGS. 1 to 4. It is further to be noted that the following embodiment does not limit the invention according to each claim, and all the combination of subject features explained in the embodiment is not always essential for solution of the present invention.

Figure 1:
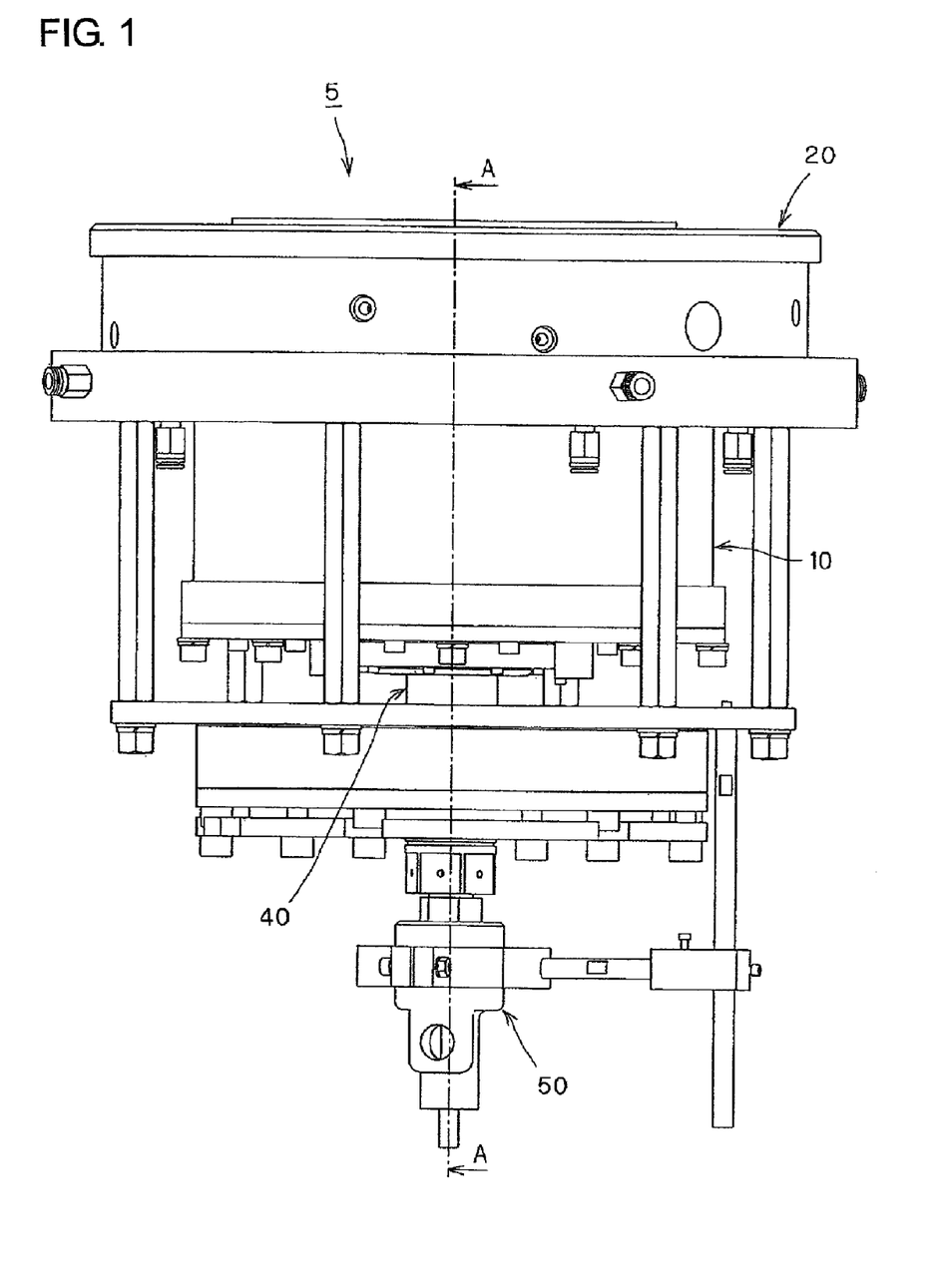
FIG. 1 is a front view illustrating an entire structure of a rotary table device provided with a cooling structure according to a present embodiment.
Figure 2:
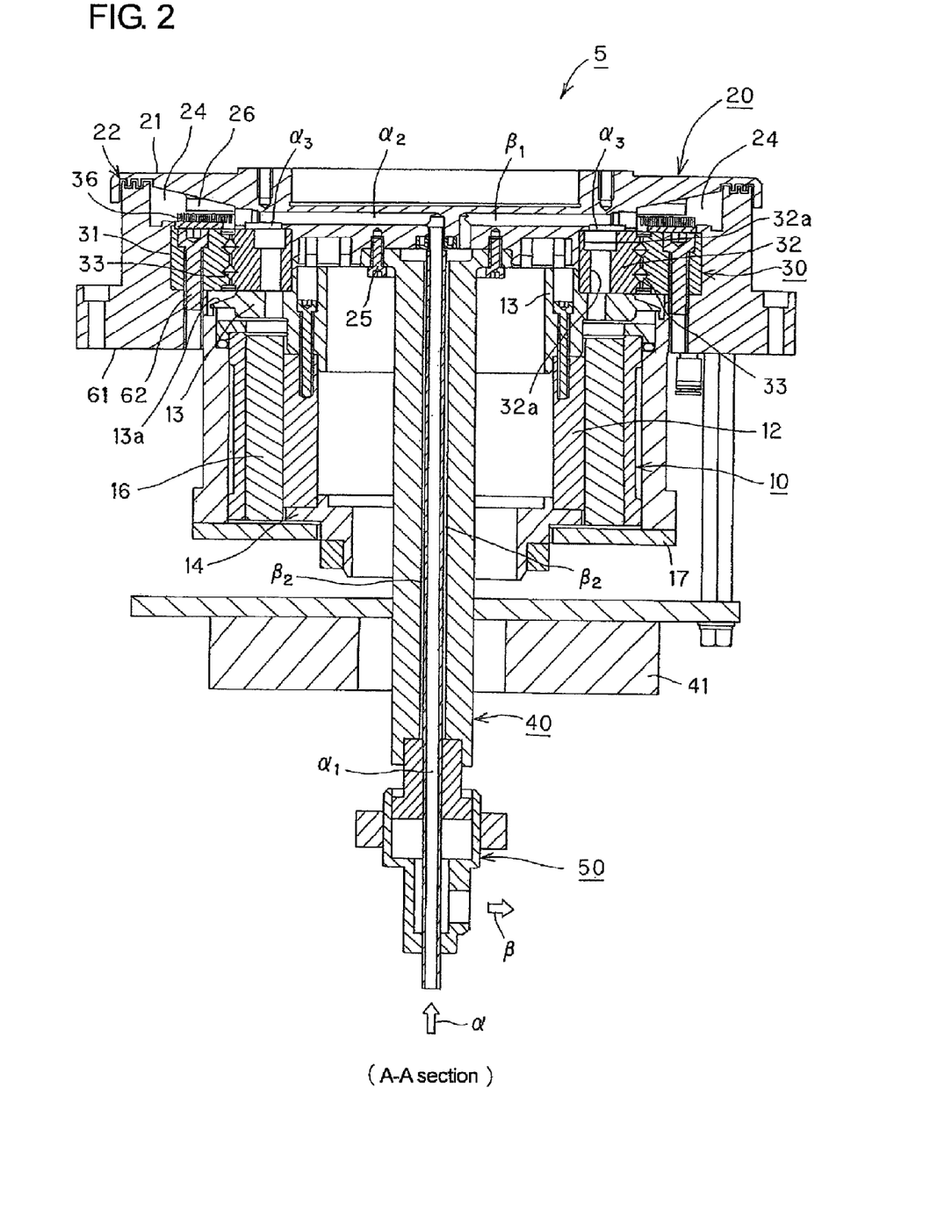
FIG. 2 is a longitudinal sectional view for explaining a specific structure of the rotary table device provided with the cooling structure of the present embodiment, and specifically shows an A-A section in FIG. 1.
Figure 3:
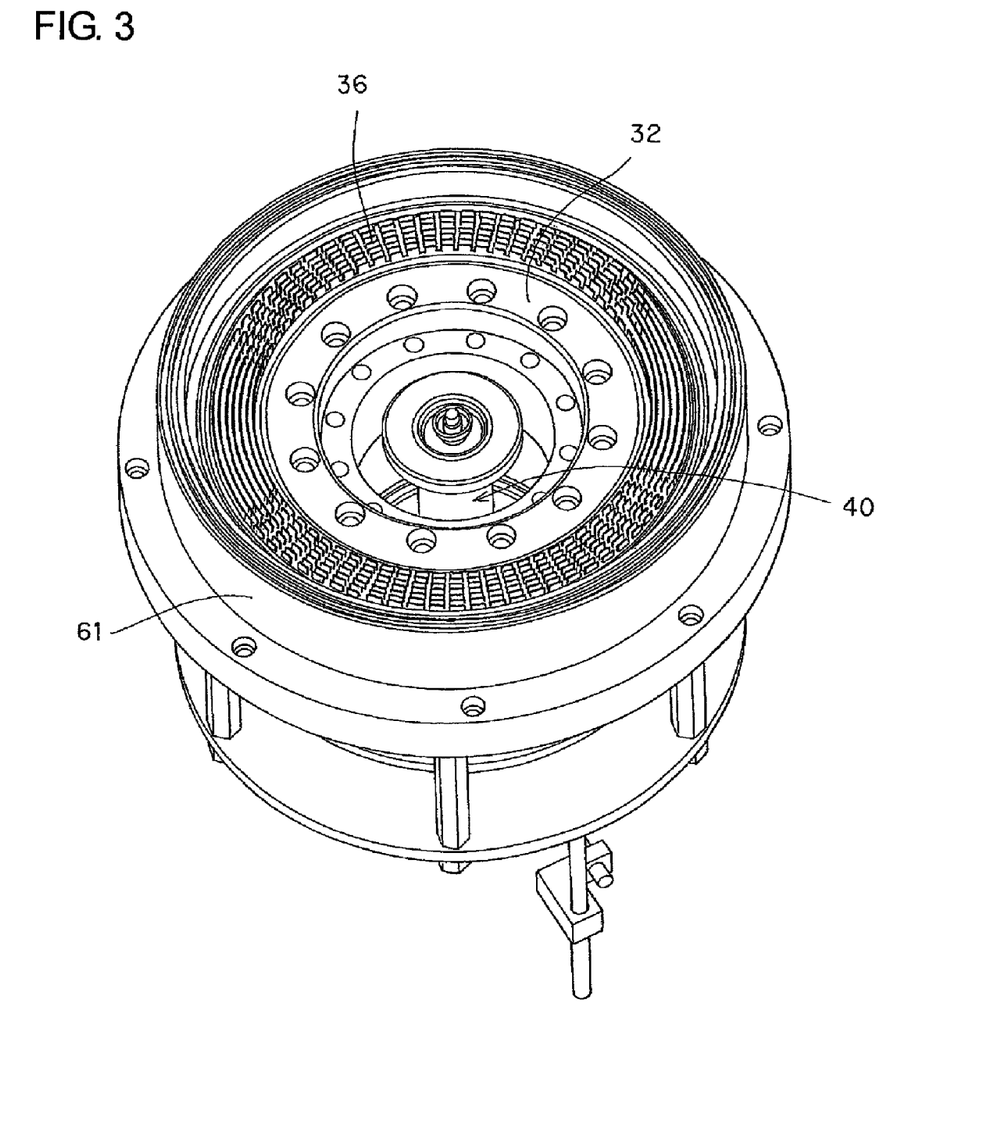
FIG. 3 is a perspective view for explaining a specific structure of the rotary table device provided with the cooling structure of the present embodiment, and specifically shows an upper surface side of the rotary table device from which a table is dismounted.
Figure 4:
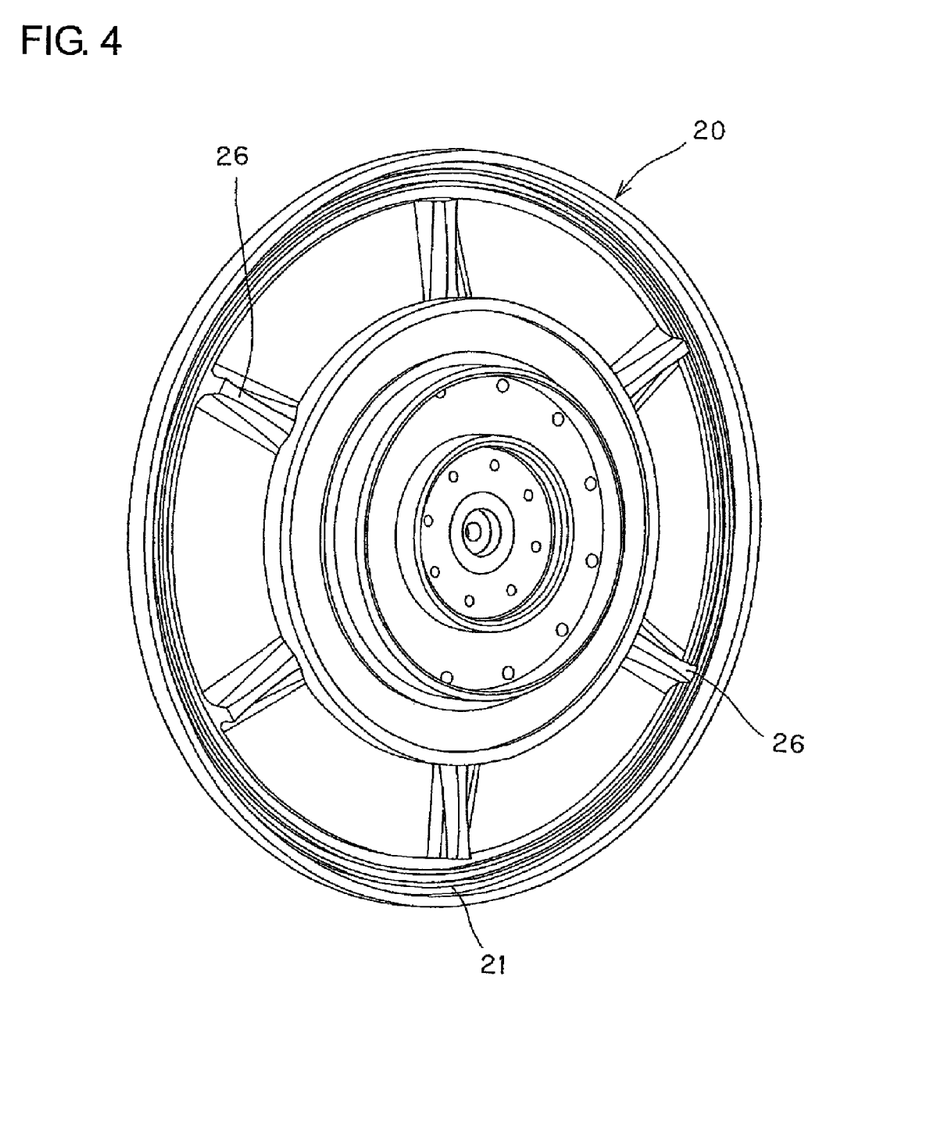
FIG. 4 is a perspective view for explaining a specific structure of the rotary table device provided with the cooling structure of the present embodiment, and specifically shows a rear surface side of the dismounted table.

FIG. 1 is a front view illustrating an entire structure of a rotary table device provided with a cooling structure according to a present embodiment. FIG. 2 is a longitudinal sectional view for explaining a specific structure of the rotary table device provided with the cooling structure of the present embodiment, and specifically shows an A-A section in FIG. 1. Furthermore, FIGS. 3 and 4 are perspective views for explaining a specific structure of the rotary table device provided with the cooling structure of the present embodiment, in which FIG. 3 shows an upper surface side of the rotary table device from which a table is dismounted, and FIG. 4 shows a rear surface side of the dismounted table. Further, in the following embodiment, a rotary bearing according to the present invention is shown, as an example, as a rotary roller bearing 30 which is assembled with a rotary table device 5.

The rotary table device 5 provided with a cooling structure according to the present embodiment is provided with a hollow motor 10, a table 20, a rotary roller bearing 30, a brake shaft 40, and a rotary joint 50.

The hollow motor 10 is a motor having an inner rotor structure in which a rotor as a rotating member is disposed on an inner side and a stator as a fixed member is disposed on an outer side, and the hollow motor 10 functions as a direct-drive motor which directly applies a rotary drive force to the table 20. The rotor is provided with a permanent magnet 12 on a surface facing to the stator, and this permanent magnet 12 functions as field flux generation source. On the other hand, on the stator side, a coil member 16 as a magnetic field generation source is arranged. Accordingly, by the mutual functions of the permanent magnet 12 and the coil member 16, the hollow motor 10 is rotationally driven. Further, the stator is joined fixedly at a lower side thereof to a fixed member 17, so that when the hollow motor 10 is driven, only the rotor side is stably driven to be rotated.

The rotor is provided with an upper member 13 disposed on an upper portion of the permanent magnet 12 and a lower member 14 disposed on a lower portion thereof.

The rotary roller bearing 30 is arranged on the upper portion of the upper member 13 formed to the rotor. This rotary roller bearing 30 is generally composed of an outer ring 31 having an inner peripheral surface in which two rows of rolling surfaces are formed, an inner ring 32 disposed inside the outer ring 31 having an outer peripheral surface in which two rows of rolling surfaces are formed so as to respectively oppose to the two rows of rolling surfaces formed to the outer ring 31, and a number of rollers 33 incorporated in a rolling passage defined between the inner and outer rings 32 and 31.

The upper member 13 disposed on the rotor has a configuration capable of sandwiching the inner ring 32 of the rotary roller bearing 30 in association with the table 20 which will be fixed above the brake shaft 40 by means of bolt 25 so that the upper member 13 and the table 20 act as a mount member, in association with each other, for mounting the inner ring 32. That is, the firm fastening state can be ensured by sandwiching the inner ring 32 of the rotary roller bearing 30 between the upper member 13 and the table 20.

According to the structure described above, when the hollow motor 10 is driven to be rotated, the inner ring 32 side of the rotary roller bearing 30 is also rotated in accordance with the rotation of the rotor. That is, in the rotary roller bearing 30 of the present embodiment, the inner ring 32 side functions as a rotationally driving side. On the other hand, as for the outer ring 31 of the rotary roller bearing 30, since the outer ring 31 is surely fixed to a fixing member 61 by means of bolt 62 with respect to installation standard for a machine tool, the driving force of the hollow motor 10 is surely transmitted to the inner ring 32 side of the rotary roller bearing 30.

Further, the upper member 13 to be mounted to the rotor is provided with a fin-shaped portion 13a at a portion connected to the inner ring 32 of the rotary roller bearing 30, so that heat which may be generated on the inner ring 32 side by high speed rotation of the rotary roller bearing 30 can be radiated by the function of the fin-shaped portion 13a to thereby achieve the cooling effect. More in detail for this function, the fin-shaped portion 13a is formed so as to provide an increased surface area to contact air for absorbing a large amount of heat in a wide area, thus achieving heat radiation effect. Furthermore, since the fin-shaped portion 13a is rotated together with the inner ring 32, when the inner ring 32 is rotated, the heat radiation effect by the rotary drive force can be improved in comparison with a case of rotation-stop period of the inner ring 32. In other wards, the fin-shaped portion 13a can promote the external heat radiation, and thus, according to this structure, the heat radiation effect can be also enhanced.

As mentioned above, the table 20 is disposed above the inner ring 32 of the rotary roller bearing 30, and this table 20 functions as a member for holding a workpiece to be worked by a machine tool. The table 20 is rotated by receiving the rotary drive force by the hollow motor 10 to thereby perform the working to the workpiece. Further, the table 20 can be smoothly and stably rotated by the supporting function of the rotary roller bearing 30 disposed between the hollow motor 10 and the table 20.

As also mentioned above, the brake shaft 40 is disposed to the central portion of the lower side surface of the table 20 by using the bolt 25. This brake shaft 40 is a member acting as a path forming pipe in which cooling medium paths ($\alpha$, $\beta$), which will be mentioned hereinafter, are formed, and one end side (upper side on the drawing of FIG. 2) of the brake shaft 40 is fixed to the table 20 so as to be rotated together with the table 20. Further, the brake shaft 40 is arranged so as to extend downward through a hollow portion of the rotor of the hollow motor 10, and on the other end side (lower side on the drawing of FIG. 2), a rotary joint 50 is disposed. According to such structure, the cooling medium is transferred between the brake shaft 40 rotated with the table 20 and the fixed rotary joint 50.

Further, the brake shaft 40 is equipped with a brake device 41 at an intermediate portion between the hollow motor 10 and the rotary joint 50. This brake device 41 is operated in response to a stop signal received from a control device such as machine tool, not shown, to thereby surely stop the rotational motion of the brake shaft 40.

Hereunder, a cooling structure for cooling the inner ring 32 side of the rotary roller bearing 30 by using cooling medium will be described.

As shown in FIG. 2, the rotary table device 5 provided with the cooling structure according to the present embodiment is formed, in adjacent to the inner ring 32 of the rotary drive side, with the cooling medium paths ($\alpha$, $\beta$) through which the cooling medium can flow. The cooling medium paths ($\alpha$, $\beta$) include: a cooling medium introducing path cooling medium path $\alpha$ which extends in the interior of the brake shaft 40 from the rotary joint 50, passes through the interior of the table 20 and goes round along the upper outer peripheral surface on the inner ring 32 side of the rotary roller bearing 30; and a cooling medium discharging path $\beta$ extends in the interior of the brake shaft 40 through the interior of the table 20 from the cooling medium introducing path $\alpha$ and communicates with an external side through the rotary joint 50.

The cooling medium introducing path a first extends so as to penetrate the central portion of the rotary joint 50 and then extends along a route shown with a symbol $\alpha_1$ formed in the central portion of the brake shaft 40 along the axial line thereof. The cooling medium introducing path $\alpha$ extending upward is then connected to a central portion of the table 20 and turns as a path shown with a symbol $\alpha_2$ formed linearly toward an outer peripheral portion from the central portion of the table 20. The cooling medium introducing path $\alpha$ extending near the outer peripheral end of the table 20 is then connected to a path shown with a symbol $\alpha_3$ going around along the upper peripheral end surface of the rotary roller bearing 30. The cooling medium introducing path $\alpha$ is ended at a portion when it reaches the end portion going around the outer peripheral surface of the rotary roller bearing.

Further, it is to be noted that the path shown with the symbol $\alpha_3$ branched from the path shown with the symbol $\alpha_2$ is branched in both lateral directions so as to cool the entire periphery of the upper peripheral surface of the rotary roller bearing 30.

On the other hand, the cooling medium discharging path $\beta$ is connected to the path shown with the symbol $\alpha_3$ extending around along the upper outer peripheral surface of the rotary roller bearing 30, and this cooling medium discharging path starts from a path shown with a symbol $\beta_1$ extending linearly toward the central portion from a portion near the outer peripheral end of the table 20.

Further, it is to be noted that the path shown with the symbol $\beta_1$ in the table 20 of the cooling medium discharging path $\beta$ and the path shown with the symbol $\alpha_2$ in the table 20 of the cooling medium introducing path $\alpha$ are paths both formed at quite different portions, and for example, it is preferred to form them at portions possibly apart from each other.

The cooling medium discharging path $\beta$ extending from the central portion of the table 20 is further extends into the brake shaft 40. In this case, it is preferred that the path shown with the symbol $\beta_2$ passing through the interior of the brake shaft 40 is formed so as to be located on the outer peripheral side of the cooling medium introducing path $\alpha$ extending upward along the axial line of the brake shaft 40.

Subsequently, the cooling medium discharging path $\beta_1$ reaching the lower end of the brake shaft 40 is connected to the rotary joint 50 so as to communicate with an external side.

The thus formed cooing medium introducing path $\alpha$ and the cooling medium discharging path $\beta$ are configured so that the cooling medium can pass therethrough. As such cooling medium, for example, oil, water or liquid nitrogen as liquid solution, or carbon dioxide, hydrocarbon (propane, isobutene or like), ammonium, air or argon gas as gaseous cooling medium, will be usable.

Such cooling medium is smoothly transferred between the brake shaft 40 and the rotary joint 50, that is, between a rotary member and a stationary (fixed) member, by the function of the rotary joint.

Further, the cooing medium introducing path $\alpha$ of the present embodiment shown in FIG. 2 includes a path portion shown with a symbol $\alpha_3$ formed along the upper surface of the rotary roller bearing 30. On the other hand, the inner ring 32 of the rotary roller bearing 30 is generally formed with a bolt hole 32a for fastening the inner ring 32. Accordingly, in order to flow the cooling medium, with no leakage, into the cooling medium introducing path $\alpha$, it is necessary to clog the bolt hole 32a. The clogging of this bolt hole 32a will be made by applying a seal member to the bolt hole 32a, or by placing a plate member so as to close the upper surface of the inner ring 32. Further, in the present embodiment, since it is not necessary to use the bolt hole 32a of the inner ring 32, it may be possible to eliminate the formation of such bolt hole 32a.

Furthermore, a cooling medium before being heated passes inside the cooing medium introducing path $\alpha$ and, on the other hand, a cooling medium after being heated passes inside the cooling medium discharging path $\beta$. Accordingly, it may be desired that these cooing medium introducing path $\alpha$ and the cooling medium discharging path $\beta$ are formed at positions possibly apart from each other. Further, as mentioned above, in the table 20, the cooing medium introducing path $\alpha$ and the cooling medium discharging path $\beta$ are arranged so as to take positions most apart from each other.

However, within the brake shaft 40, the cooing medium introducing path $\alpha$ and the cooling medium discharging path $\beta$ must extend in an extremely close state in distance, which may provide a structural problem. With this problem, in the present embodiment, the cooling medium before being heated passes at the central portion of the brake shaft 40, and on the other hand, the cooling medium after being heated passes in the outer peripheral side of the brake shaft 40. According to this arrangement, since the heated cooling medium is positioned near outer atmosphere side, the accumulation of the heat in the brake shaft 40 can be extremely reduced. Furthermore, as a countermeasure against the heat within the brake shaft 40, there may be adopted an improved positional arrangement of the cooing medium introducing path α and the cooling medium discharging path β, and there may be also adopted a method of improving heat insulating performance of the cooing medium introducing path α and the cooling medium discharging path β themselves by, for example, winding an heat insulating material around the outer peripheral surface of an inner pipe constituting the cooing medium introducing path α and the cooling medium discharging path β.

Next, a structure for cooling the outer ring 31 side of the rotary roller bearing 30 will be explained.

As shown in FIG. 2, a heat sink 36 is disposed to a peripheral surface on an upper side of the outer ring 31 of the rotary roller bearing 30. This heat sink 36 is, as shown in FIG. 3, located around the entire circumference above the peripheral surface of the outer ring 31. Further, it is considered that a heat generated to the rotary roller bearing 30 may be caused by a friction heat generated in contact with the rolling surface and the roller 33 and by a heat generated by agitation resistance when the roller 33 agitates a lubricating agent such as grease, and such heat is transferred to the inner and outer rings 32 and 31 through the rollers 33. Further, the heat sink 36 is disposed so as to effectively radiate the heat to be transferred to the outer ring 31 in these heats. The heat sink 36 may be preferably formed of a metal material such as aluminium, copper or like having a good heat conductive property.

On the other hand, blower blades 26 are mounted to a rear surface on the lower side of the table 20. These blower blades 26 are arranged to positions opposing to the heat sink 36, and when the table 20 is rotated, cooling wind is generated by the blower blades 26 to thereby forcibly increase air moving amount, thus enhancing the cooling ability of the heat sink 36.

Further, as shown in detail in FIG. 4, the blower blades 26 according to the present embodiment have the same configurations in the rotating directions on both sides of the blade 26 so that similar cooling winds can be generated even if the table is rotated in either one of right or left direction. Furthermore, the blower blades 26 have a length substantially overlapped with the entire length in the circumferential direction of the heat sink 36 so that the cooling wind can be blown to the entire surface of the heat sink 36. Further, it is to be noted that although the table 20 of the present embodiment shown in FIG. 4 represents a case in which six blower blades 26 are formed, the number and/or shape of the blower blades 26 is not limited to the described one and other optional changes or alternated modes may be made in accordance with use conditions or required specifications.

Furthermore, the heat sink 36 and the blower blades 26 have such a characteristic feature as that they are arranged within a space 24 sectioned from an outside by a shielding member 20 (21), 61 including a labyrinth structure 22. More specifically, as shown in FIG. 2, the table 2 is provided with an extending portion 21 extending to the entire outer peripheral side thereof, and a structure having an irregular-shaped longitudinal sectional surface is adopted to a rear surface of the tip end side of the extending portion 21. On the other hand, to the outer ring 31 of the rotary roller bearing 30, as mentioned above, the fixing member 61 fixed with respect to the location standard side of a machine tool or like, and for this fixing member 61, there is also adopted a structure having an irregular-shaped longitudinal sectional surface. As mentioned above, in association with the irregular-shaped longitudinal sectional shape of the rear surface of the extending portion 21 and the irregular-shaped longitudinal sectional shape of the upper side of the fixing member 61, the labyrinth structure 22 is provided, thus defining the space 24 sectioned from the outside.

The space 24 mentioned above achieves function and effect for preventing foreign material from entering the rotary roller bearing 30 or like from the outside thereof, which is extremely preferred effect for the rotary table device 5 according to the present embodiment. That is, a relatively large foreign material invading from the outside can be prevented from entering by the function of the labyrinth structure 22 itself. In addition, at a time when the cooling wind is generated by the operation of the blower blades 26 according to the rotational motion of the table 20, the inner pressure of the inside of the space 24 is increased, and fine foreign materials can be always prevented from entering inside due to pressure difference between the thus increased inner pressure and an outer pressure of the outside of the space 24.

In a technical field of machine tools, it will be considered to cause a case such that working is done with the table 20 being fixed. In such case, it is impossible to cause such pressure difference between the inner pressure and outer pressure of the space 24, and hence, there is such a fear that fine foreign materials pass through the labyrinth structure 22 and invade into the rotary roller bearing side. As a countermeasure to prevent such phenomenon from causing, it may be possible to prevent the foreign materials from invading from the outside of the space 24 by, for example, feeding air into the space 24 to thereby increase the inner pressure within the apace 24. Further, in a general rotary roller bearing, an lubricant oil in shape of mist is fed by means of air, and accordingly, by utilizing such mechanism, at the rotation stop period of the table 20, only the air is introduced in the rotary roller bearing 30 side (i.e., inside of the space 24) by stopping the feeding of the lubricant oil, and thus, the inner pressure within the space 24 can be increased. By adopting such mechanism, without newly changing design or like, it becomes possible to achieve the function and effect of preventing the very fine foreign materials from entering inside the space from the outside.

Hereinabove, a preferred embodiment of the rotary table device 5 including the rotary roller bearing 30 and the cooling mechanism provided with the cooling structure according to the present embodiment was explained. However, the technical scope of the present invention is not limited to the described range of the above-mentioned embodiment, and the above embodiment may include possibility of various changes and modifications.

For example, with the cooling medium introducing path α, there was explained the case with reference to the exemplary example in which the portion going around along the outer peripheral surface of the rotary roller bearing 30 shown with the symbol $α_3$ is formed so as to be along only the upper surface side of the inner ring 32 of the rotary roller bearing 30. However, the cooling medium introducing path of the present invention is not limited to this example, and that portion may be formed along at least one portion of the peripheral surface of the inner ring or outer ring forming the rotationally driving side. Furthermore, if it is allowable to be formed in structure, the cooling medium path may be formed on the inner surface side or lower surface side of the inner ring 32, or formed along the outer ring 31 if the outer ring 31 side is constituted as rotationally driving side.

In this modified embodiment, substantially the same explanation may be applied to the heat sink 36 and the blower blades 26, and the locating positions of the heat sink 36 and the blower blades 26 may be formed not only on the upper side of the outer ring 31 but also other portion of the outer ring 31 or inner ring 32 side, if it is allowable to be formed in structure.

Furthermore, the rotary bearing of the present invention is not limited to the rotary roller bearing 30 mentioned above, and every-type rotary bearing such as a bearing using balls as rolling members may be utilized as far as the rotational motion of the table 20 can be properly supported.

Still furthermore, in the described embodiment, the hollow motor of the present invention was described with reference to the case in which the hollow motor is constituted as an inner-rotor type hollow motor 10 in which a rotor as a rotating member is disposed inside and a stator as a fixed member is disposed outside. However, the hollow motor of the present invention may be changed with an outer-rotor type hollow motor in which the stator as a fixed member is disposed inside and the rotor as a rotating member is disposed outside.

It is to be noted that embodiments or modes, to which the above changes or modifications are applied, are included in technical range of the present invention, which is apparent from the scopes of the appended claims.

The invention claimed is:

1. A rotary table device provided with a cooling structure, comprising:
    a hollow motor arranged as a drive source;
    a table to be rotated by the hollow motor, the table being provided with a blower blade; and
    a rotary bearing supporting rotational motion of the table, the rotary bearing comprising:
        an outer ring having an inner peripheral surface to which a rolling surface is formed;
        an inner ring having an outer peripheral surface to which a rolling surface facing the rolling surface of the outer ring is formed; and
        a number of rolling members disposed in a rolling passage formed by the rolling surface of the outer ring and the rolling surface of the inner ring,
    wherein a heat sink is formed to either one of the inner ring and outer ring.

2. The rotary table device provided with a cooling structure according to claim 1, wherein the blower blade is arranged at a position opposing to the heat sink.

3. The rotary table device provided with a cooling structure according to claim 1, wherein the heat sink is formed along an entire circumferential direction of a peripheral portion of the inner ring or outer ring.

4. The rotary table device provided with a cooling structure according to claim 1, wherein the blower blade and the heat sink are disposed in a space sectioned from an outside thereof by a shielding member including a labyrinth structure.

* * * * *